United States Patent [19]
Duyvesteyn et al.

[11] Patent Number: 5,571,308
[45] Date of Patent: Nov. 5, 1996

[54] METHOD FOR RECOVERING NICKEL FROM HIGH MAGNESIUM-CONTAINING NI-FE-MG LATERITIC ORE

[75] Inventors: Willem P. C. Duyvesteyn; Manuel R. Lastra; Houyuan Liu, all of Reno, Nev.

[73] Assignee: BHP Minerals International Inc., Reno, Nev.

[21] Appl. No.: 502,923

[22] Filed: Jul. 17, 1995

[51] Int. Cl.$^6$ ............................................. C22B 3/42
[52] U.S. Cl. ........................ 75/430; 75/712; 75/743; 423/139; 205/589; 205/591
[58] Field of Search .................. 75/430, 712, 743; 204/112, 113; 423/139

[56] References Cited

U.S. PATENT DOCUMENTS

| | | | |
|---|---|---|---|
| 4,097,575 | 6/1978 | Chou et al. | 423/150.4 |
| 5,178,666 | 1/1993 | Diaz et al. | 75/629 |
| 5,385,600 | 1/1995 | Jounela | 75/430 |

Primary Examiner—Melvyn Andrews
Attorney, Agent, or Firm—Hopgood, Calimafde, Kalil & Judlowe

[57] ABSTRACT

A method is provided for recovering nickel from high magnesium-containing lateritic ores which also contain iron. The ores which are referred to as saprolitic ores are subjected to leaching with a mineral acid from the group consisting of HCl, $H_2SO_4$ and $HNO_3$, HCl being preferred.

Following leaching with HCl, for example, the pregnant solution obtained is separated from undissolved solids and the nickel preferably recovered by contacting the solution with a resin selective to nickel absorption. The raffinate remaining which contains iron and magnesium chlorides may be subjected to pyro-hydrolysis to produce their respective oxides and free HCl for recycle into the leaching system. The nickel is extracted from the resin using a stripping solution of said acid, and the nickel thereafter extracted from the nickel-loaded stripping solution.

18 Claims, 10 Drawing Sheets

| | OPERATION | CHARACTERISTICS |
|---|---|---|
| S T A T I C | (A) IN-SITU LEACHING 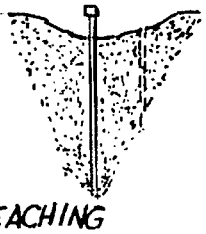 | SUBMARGINAL ORES OBTAINED BY BLASTING; ORE TREATED FOR 5-25 YEARS WITH AN OPERATIONAL CAPACITY OF $4 \cdot 10^6$ t OF ORE. |
| | (B) DUMP LEACHING  | SUBMARGINAL ORES OBTAINED BY BULLDOZING; ORE TREATED FOR 3-20 YEARS WITH AN OPERATIONAL CAPACITY OF $5 \cdot 10^6$ t OF ORE. |
| | (C) HEAP LEACHING  | LOW GRADE ORES OBTAINED BY FINE GRINDING; ORE TREATED FOR 1-2 YEARS WITH AN OPERATIONAL CAPACITY OF $3 \cdot 10^5$ t OF ORE. |
| | (D) VAT LEACHING  | SIMILAR TO LEACHING IN HEAPS BUT FOR 10-30 DAYS AND WITH AN OPERATIONAL CAPACITY OF $5 \cdot 10^3$ t OF ORE. |
| | (E) MINE WATERS 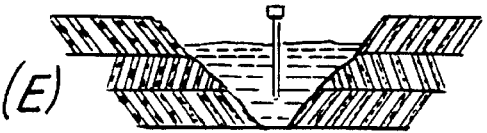 | WATERS COLLECTED AFTER RAIN IN OPEN PIT MINES. |
| D Y N A M I C | (F) CHEMICAL-BACTERIAL LEACHING 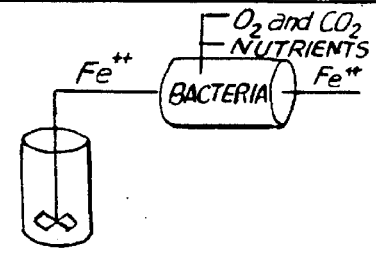 | BIOOXIDATION OF EXHAUSTED SOLUTIONS PREVIOUSLY USED IN AGITATION LEACHING. FOR THE TREATMENT OF HIGH GRADE ORES OBTAINED BY FINE GRINDING AND GRINDING. |

FIG. 10

METHOD FOR RECOVERING NICKEL FROM HIGH MAGNESIUM-CONTAINING NI-FE-MG LATERITIC ORE

This invention relates to the hydrometallurgical recovery of nickel from oxide ores, in particular, high magnesium containing lateritic ores, such as saprolite.

BACKGROUND OF THE INVENTION

It is known that nickeliferous oxide ores, e.g., those referred to as laterites, comprising limonits and saprolite, are the world's largest potential sources of nickel and cobalt.

The ability to beneficiate these ores by conventional techniques has placed these ores at an economic disadvantage in that these ores cannot be concentrated by magnetic separation by froth flotation as compared to nickeliferous sulfide ores which can be easily concentrated to substantially high levels of nickel by well known methods, such as froth flotation and matte smelting.

One process for recovering nickel and cobalt is the well known Moa Bay process involving acid leaching at elevated temperatures and pressures at which iron oxide and aluminum oxysulfate are substantially insoluble.

In the Moa Bay process, lateritic ore at minus 20 mesh (95% passing 325 mesh U.S. Standard) is pulped to approximately 45% solids and the nickel and cobalt selectively leached with sufficient sulfuric acid at elevated temperature and pressure (e.g. 230° C. to 250° C. and 405 to 580 psia) to solubilize about 95% each of nickel and cobalt in about 60 to 90 minutes. After pressure let down, the leached pulp is washed by countercurrent decantation with the washed pulp going to tailings. The leach solution pH, which is quite low (e.g., between 0 and 0.5), is then neutralized with coral mud to a pH of about 2.4 in a series of four tanks at a total retention time of about 20 minutes and the thus-treated product liquor (containing about 5.65 gpl Ni, 0.8 gpl Fe and 2.3 gpl Al), after solid-liquid separation, is then subjected to sulfide precipitation. The leach liquor is preheated and the sulfide precipitation carried out using $H_2S$ as the precipitating reagent in an autoclave at about 120° C. (250°F.) and a pressure of about 150 psig.

In the original scheme for treating the mixed sulfides, the sulfide precipitate was washed and thickened to a solids conter of 65%. It was then oxidized in an autoclave at about 177° C. (350° F.) and a pressure of about 700 psig.

The solution containing nickel and cobalt was then neutralized with ammonia to a pH (5.35) sufficient to precipitate any residual iron, aluminum, and chromium present using air as an oxidizing agent.

The precipitate was thereafter separated from the solution and the nickel and cobalt solution then adjusted to a pH of about 1.5. $H_2S$ was added to precipitate selectively any copper lead and zinc present. The precipitate was separated from the solution by filtration and the nickel recovered by various methods, one method comprised treating the nickel-containing solution with hydrogen at elevated temperature and pressure to produce nickel powder.

The aforementioned process is similar to that described in "the state of the prior art" set forth in U.S. Pat. No. 4,097,575, the disclosure of which is incorporated herein by reference.

Certain lateritic ores, in particular saprolite ores, generally have a high magnesium content and a relatively low iron content compared to limonite which must be contended with in order to efficiently recover the nickel from the pregnant leach liquor and to separate the nickel from iron, magnesium and other impurities.

Commercial practice is to smelt high grade saprolitic ore containing generally in excess of about 2% nickel to produce either ferro-nickel or nickel matte.

With respect to limonite, the nickel is extracted from the ore by high pressure leaching using sulfuric acid as the lixiviant and/or reduction roasting followed by ammonia leaching.

Acid leaching of saprolitic ore is not practiced commercially for the reason that a process has not been developed for recovering the nickel from the leach solution in an economical and simple manner.

A typical high magnesium and high iron laterite generally contains by weight at least about 5% magnesium, for example, such as 10% and higher.

The Moa Bay process would not be suitable for treating such ores due to the excessive consumption of sulfuric acid because of the high magnesium content as MgO in the ore.

We have discovered a method for leaching laterites of the saprolitic type under ambient pressure and temperature, e.g., room temperature for column/heap leaching and about 60° C. to 80° C. for agitation leaching, wherein the by-product oxides of magnesium and iron can be used to good advantage for recycle within the leaching system as a means of controlling the pH of the pregnant nickel solution prior to the extracting of nickel from the solution.

OBJECTS OF THE INVENTION

It is thus an object of the present invention to extract nickel from Ni-Fe-Mg containing lateritic ores containing relatively high amounts of magnesium and iron.

Another object of the invention is to provide a method whereby oxides of magnesium and iron can be removed from the leach liquor prior to the recovery of nickel from the pregnant solution.

These and other objects will more clearly appear from the following disclosure and the appended drawings.

IN THE DRAWINGS

Figure 4:
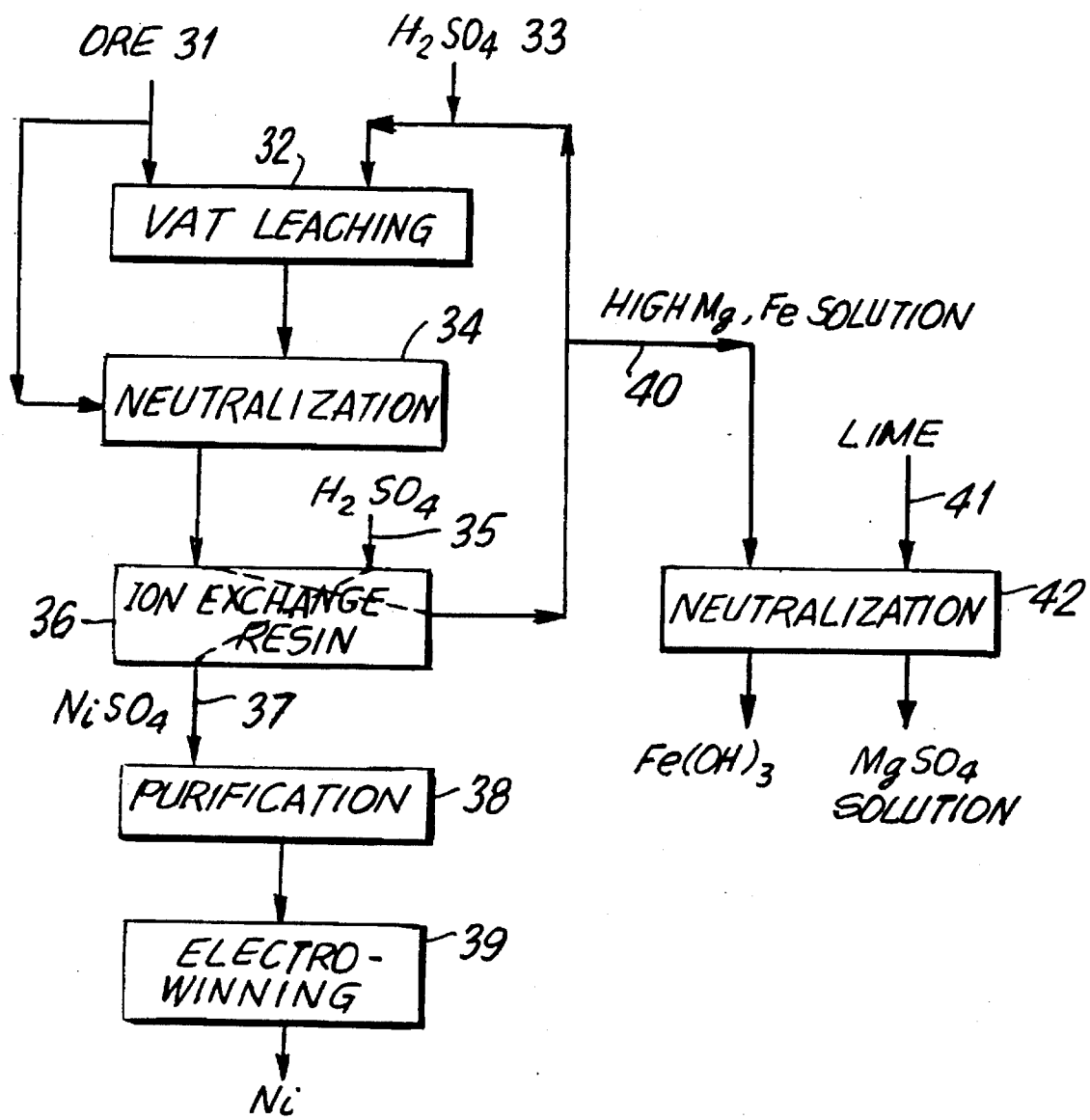
Figure 5:
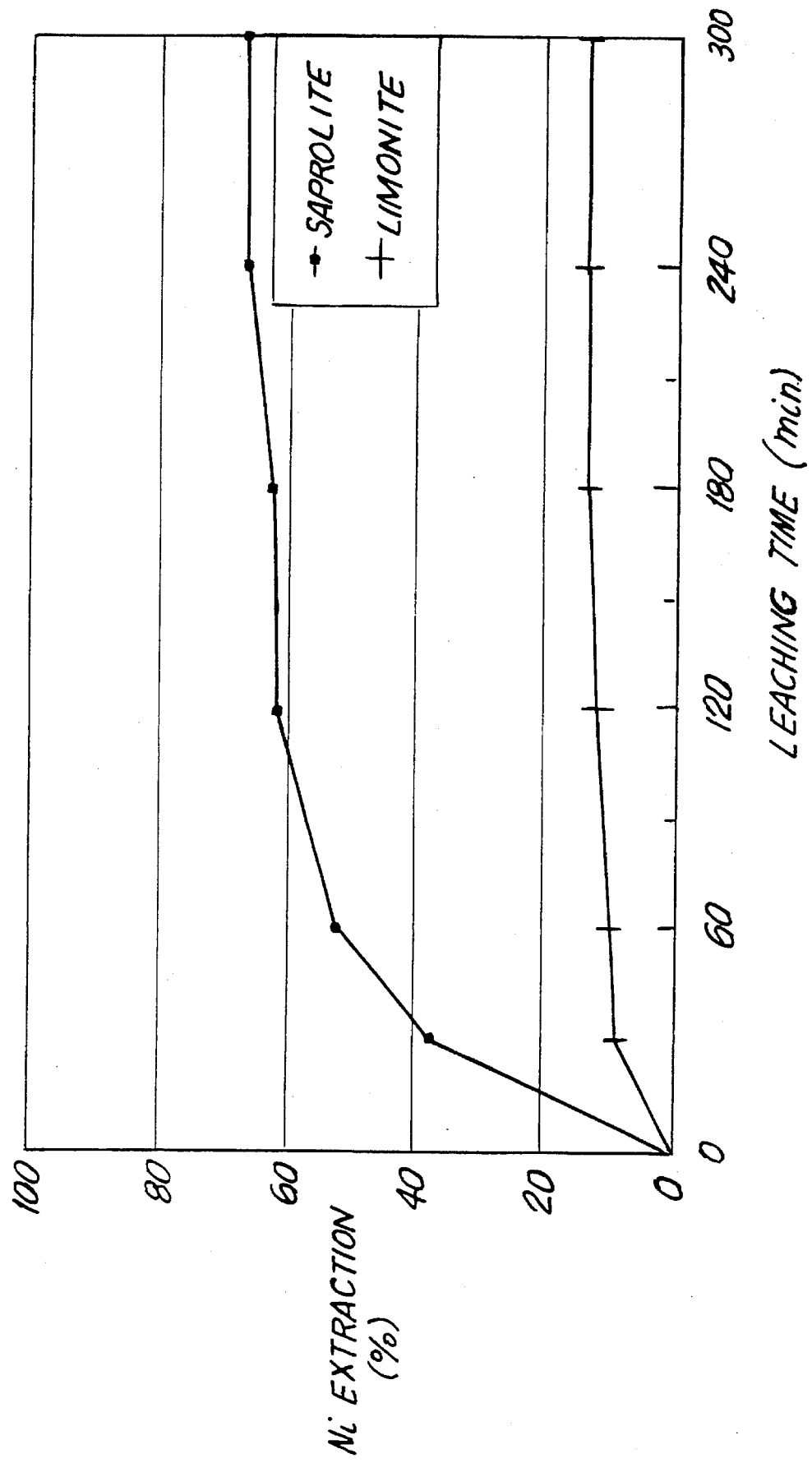
Figure 6:
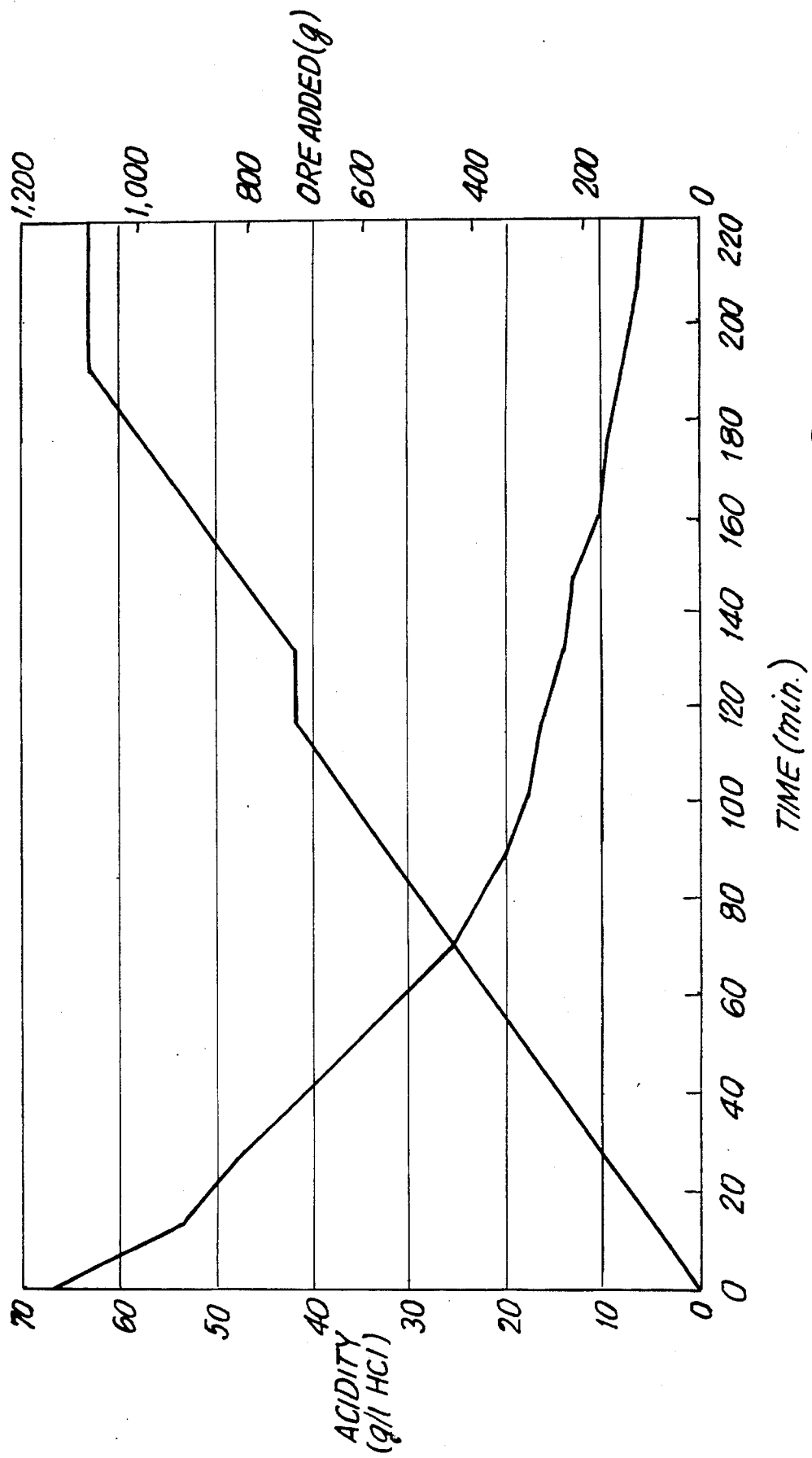
Figure 7:
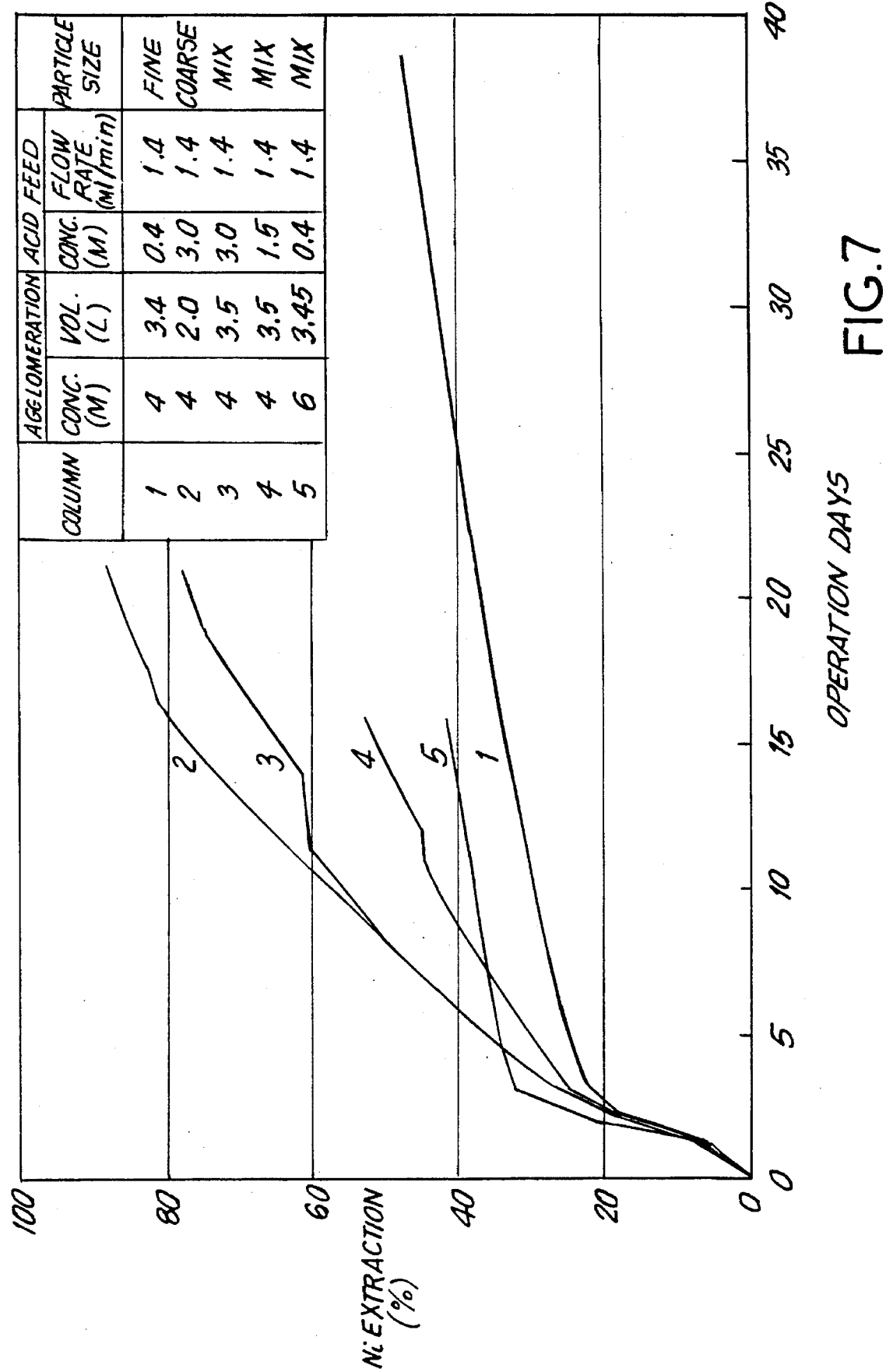
Figure 8:
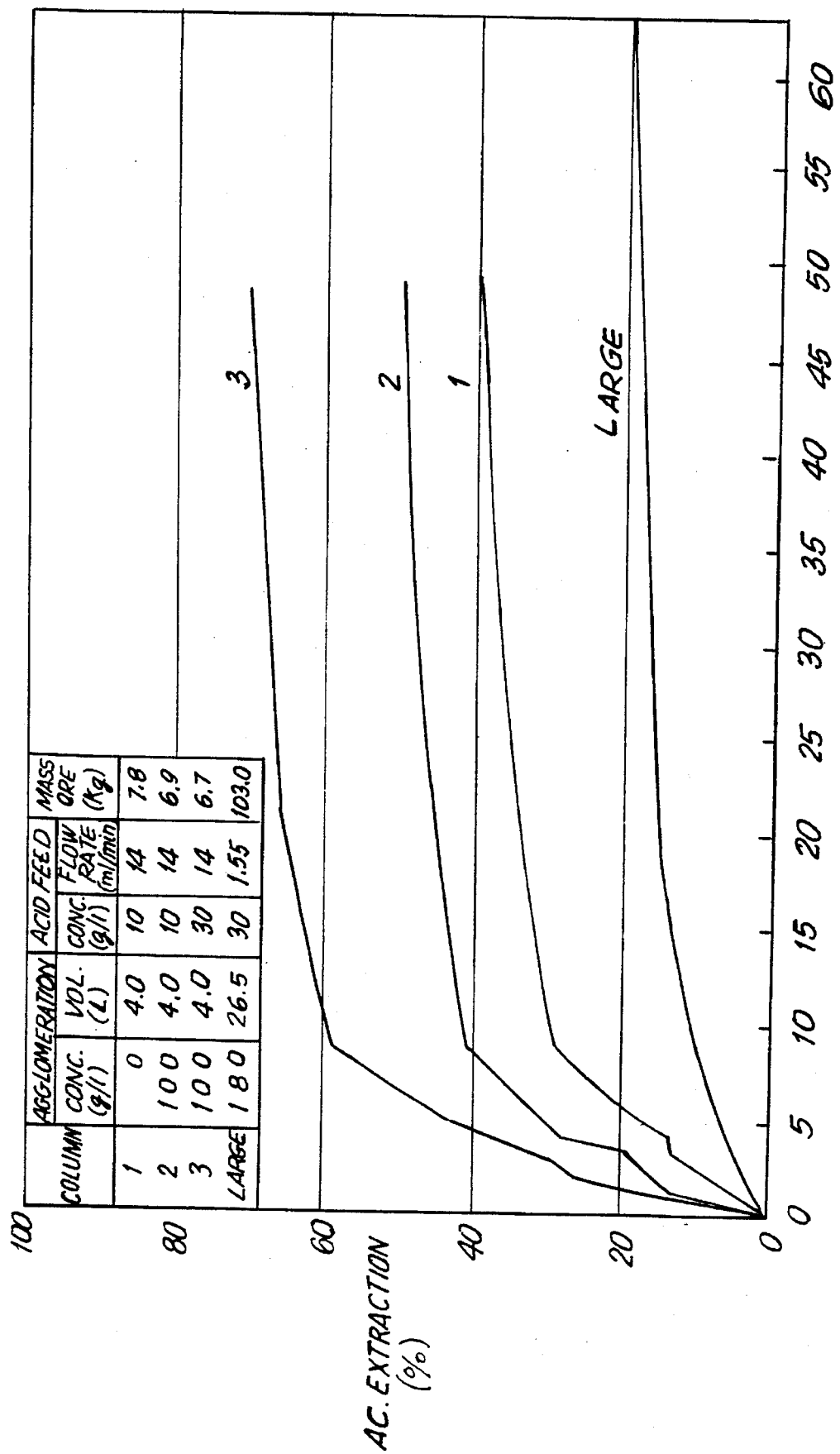
Figure 9:
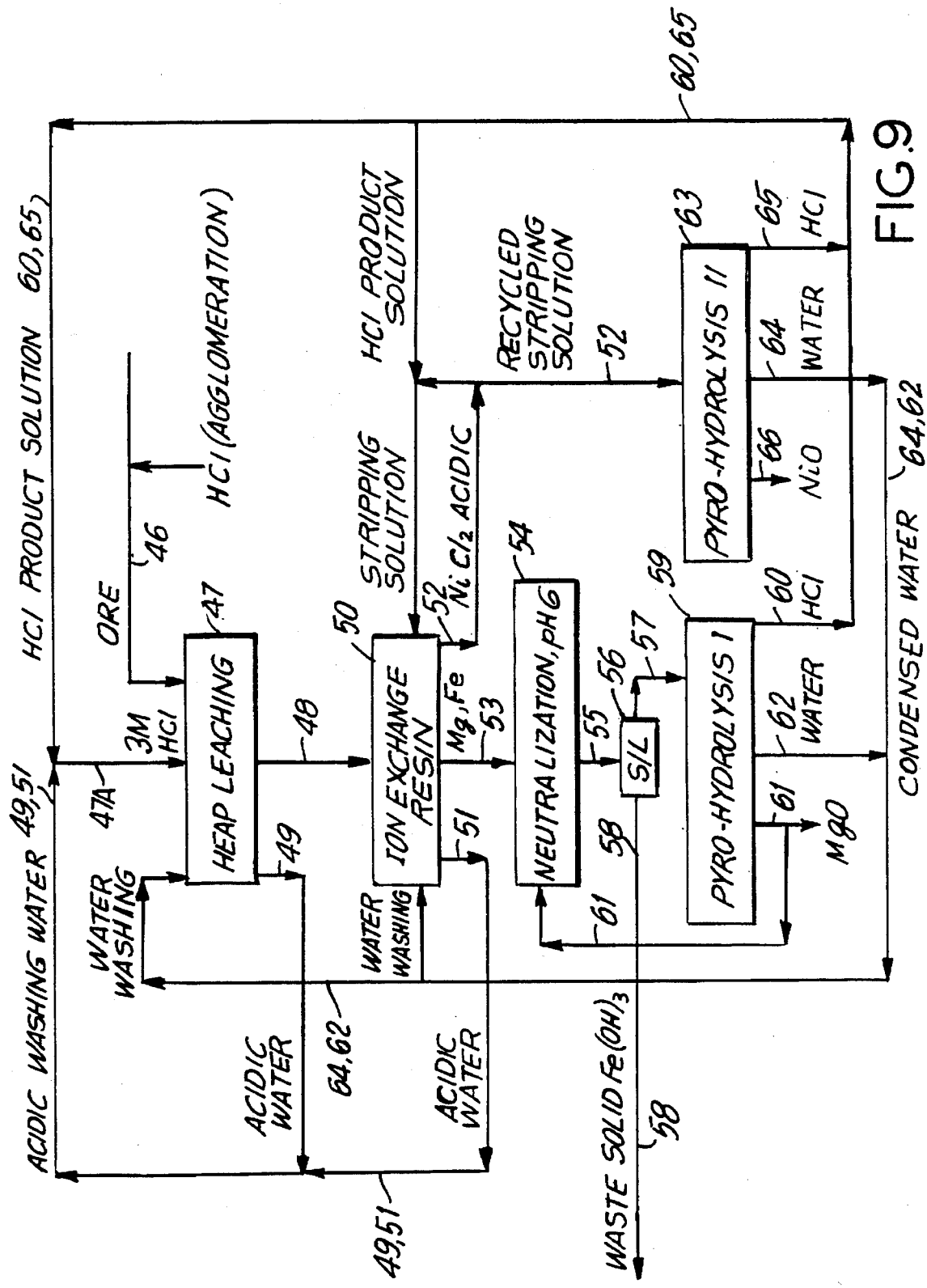

FIG. 4 relates the use of sulfuric acid in the vat or heap leaching of a high magnesium laterite ore;

FIG. 5 depicts a set of curves comparing the agitation leaching of saprolite to limonite;

FIG. 6 illustrates the relationship between acidity and addition of ore vs. time during neutralization in agitation leaching;

FIG. 7 shows curves depicting nickel extraction in vat leaching under various conditions;

FIG. 8 are curves which depict nickel extraction in $H_2SO_4$ in vat leaching under various conditions;

FIG. 9 is a flow sheet for heap leaching saprolite using hydrochloric acid; and

FIG. 10 is a chart illustrative of various types of leaching.

SUMMARY OF THE INVENTION

In accordance with the present invention, high magnesium laterite ores (e.g., saprolite), such as Ni-Fe-Mg containing ores containing by weight at least about 5% Mg, at least about 10% Fe, and at least about 0.5% Ni are subjected to dissolution by contacting the ore with a mineral acid selected from the group consisting of HCl, $H_2SO_4$ and $HNO_3$ at an acid concentration sufficient to effect the dissolution of nickel, for example, at least about 0.25 molar.

The leaching is carried out at a temperature of at least about ambient and ranging up to about 95° C. for a time sufficient to dissolve substantial amounts of nickel and some iron and magnesium and provide a pregnant solution thereof.

Following leaching and the removal of solids, the pH of the solution is adjusted, if necessary, to a range of about 1 to 3.

The solution is then contacted with an ion exchange resin selective to the absorption of nickel the raffinate remaining containing Mg and Fe. A portion of the raffinate may be recycled to the leaching stage, and the remaining portion subjected to pyro-hydrolysis to produce MgO and $Fe_2O_3$.

The absorbed nickel is thereafter extracted from the ion exchange resin by contacting the resin with a mineral acid to form a nickel solution as an eluate thereof from which the nickel is thereafter recovered. As an elute, the eluate can be repeatedly used after acidity adjustment to increase nickel concentration for pyro-hydrolysis.

DETAILS OF THE INVENTION

In essence, the process of the invention involves the heap, vat or agitation leaching of the ore with a mineral acid, i.e., HCl, $H_2SO_4$ and $HNO_3$.

Following dissolution of nickel, the leachate is adjusted in pH to about 1 to 3 by using oxides of magnesium and iron produced in the process or the fresh ore itself.

The nickel-containing leachate following separation of solids, is subjected to an ion exchange treatment with a chelating resin, in particular, a Dow resin referred to as XFS-4195, in which nickel is selectively loaded leaving a nickel-barren solution (raffinate) or wash water which is recycled into the leaching system.

Where hydrochloric or nitric acid is used as the leachant, nickel chloride or nickel nitrate is formed and concentrated following ion exchange. The nickel chloride or nickel nitrate solution is subjected to pyro-hydrolysis to form nickel oxide and recycle acid, e.g. HCl or $HNO_3$.

Pyro-hydrolysis enables the recovery of magnesium oxide and iron oxide for use as neutralizers for controlling the pH of the leachate to a level of about 1 to 3 in preparing the pregnant solution for extraction of nickel by ion exchange.

Pyro-hydrolysis also enables the recovery of Mgo exclusively as a by-product or as a neutralizer to raise the pH of the raffinate to 6 or 7 precipitate and separate iron and other impurities. After filtration, the $MgCl_2$ solution is the pregnant solution for pyro-hydrolysis.

The nickel oxide formed by pyro-hydrolysis may be used to produce metallic nickel or the nickel oxide in combination with iron oxide may be used to produce ferro-nickel.

The flow sheet for carrying out the process of the invention may include either one of FIGS. 1, 2, 3, 4 or 9, among other flow sheets.

The lateritic ores are treated in accordance with the amount of magnesium and iron as oxides present. These ores are categorized as high magnesium and low iron ores (e.g., saprolite) compared to low magnesium and high iron ores as in limonite.

However, the iron content in some saprolite ores may be relatively high (note Saprolite No. 3 in Table 1 below which contains by weight 17.5% Fe), although not as high as in limonite ores. In Table 1 three saprolite ores are compared to Limonite.

TABLE 1

| | Elementary Composition (%) of Saprolite and Limonite | | | | | | | | |
|---|---|---|---|---|---|---|---|---|---|
| | Al | Co | Cr | Fe | Mg | Mn | Ni | Si | Zn |
| Saprolite 1 | 2.9 | 0.04 | 0.91 | 12.9 | 7.06 | 0.23 | 2.3 | 19.0 | n.a. |
| Saprolite 2 | 1.76 | 0.057 | 0.87 | 8.23 | 13.7 | 0.34 | 1.73 | 22.5 | 0.035 |
| Saprolite 3 | 1.67 | 0.05 | 0.95 | 17.5 | 8.73 | 0.31 | 2.23 | 18.8 | 0.036 |
| Limonite | 3.43 | 1.78 | 1.78 | 36.8 | 2.84 | 0.74 | 2.19 | 7.58 | 0.054 |

The difference in leaching behavior in the agitation tests between saprolitic ores and limonite ores will clearly appear from the curves of FIG. 5 which show that the leaching behavior of the two ores is quite different under the same HCl agitation leaching conditions.

As is clearly apparent from the table, the saprolite ores have a relatively high magnesium content of the order of about 7.06%, 8.73% and 13.7% by weight. Limonite has a much lower magnesium content of about 2.84% by weight.

With respect to saprolite No. 1 or No. 2, the following leaching conditions with hydrochloric acid were employed.

| Hydrochloric Acid Leaching | |
|---|---|
| Ore Sample | Saprolite No. 1 or No. 2 |
| Particle size | 80% wt through 200 mesh |
| HCl Concentration | 18% at 6M |
| Solids Concentration | 36% by weight at 600 gpl |
| Leaching Temperature | Room Temperature (23° C.) and 60°–80° C. |
| Leaching Time | Five hours |

As a result of agitation leaching, an extraction of 67% was obtained at room temperature and 89% at the higher temperature range of about 60° C. to 70° C. It was observed that the leaching kinetics of nickel are fairly fast during the first 30 minutes and then relatively constant over the remaining leaching time. Impurities, such as magnesium, iron and manganese among others, displayed similar kinetics, thus resulting in a substantially high acid consumption in the initial leaching stage which indicated that the leaching of nickel was accompanied by decomposition of saprolite.

In the leaching test hereinabove, the concentration of free HCl remaining in the agitation leachate was 2M. Because high acidity will generally cause operational difficulties in the ion exchange recovery of nickel, a slurry of magnesium oxide from pyro-hydrolysis is added to the hot leachate (e.g. 70° C.) to neutralize the residual free acid in hot leachate to a pH level of approximately 1.

An advantage of the process of the invention is that the neutralizing agent, for example, MgO, is a recycle by-product of the process. Thus, the treatment of the high magnesium ore enables the use of a recycle system wherein the oxides comprising magnesium oxide and iron oxide are separated from the leachate as solids after the dissolution of nickel and cobalt from the ore, then used as a neutralizing agent to reduce the acidity of the final nickel solution to a pH range of about 1 to 3.

As illustrative of the kinetics of neutralization, reference is made to Table 2 below.

ore comprised of 600 gpl was fed at a constant rate of 10 ml/min. The results are shown in Table 4.

TABLE 4

| | Continuous Leaching and Neutralization Results | | | | | | |
|---|---|---|---|---|---|---|---|
| | Ore Added (g) | Volume (l) | HCl (g/l) | Ni (g/l) | Fe (g/l) | Co (g/l) | Mg (g/l) |
| Initial Sample | 600 | 0.6 | 219 | 0 | 0 | 0 | 0 |
| After Leaching | 0 | 0.6 | 67.16 | 10.2 | 41.5 | 0.16 | 33.8 |
| After Neutralization | 1650 | 2.9 | 5.84 | 5.48 | 0.54 | 0.13 | 14.6 |

As will be noted, the concentration of nickel decreased after neutralization going from 10.2 gpl after leaching to 5.48 gpl after neutralization. This was due to the addition of water included in the slurry. Actually there was an increase in the amount of nickel leached after neutralization. A comparison of acidity and ore added vs. time is shown in FIG. 6. The nickel extraction for this process was 22.8%.

TABLE 2

| | Composition of Leachate at Different Acidities | | | | | | | | |
|---|---|---|---|---|---|---|---|---|---|
| Leachate | HCl g/l | Al g/l | Co g/l | Cr g/l | Tot. Fe g/l | Fe + 2 g/l | Mg g/l | Mn g/l | Ni g/l | Si g/l |
| Original | 75.1 | 2.58 | 0.15 | 0.58 | 33.8 | 0.78 | 28.2 | 0.89 | 9.94 | 0.08 |
| Sample 1 | 25.5 | 2.20 | 0.15 | 0.15 | 8.88 | 0.25 | 49.5 | 0.23 | 10.5 | 0.23 |
| Sample 2 | 4.38 | 0.19 | 0.13 | <0.01 | 0.43 | 0.22 | 51.5 | 0.83 | 8.95 | 0.02 |

Another method for neutralizing the leachate is to use fresh saprolite ore which contains both magnesium and iron oxides.

The fresh saprolite ore is added at a solution temperature of about 70° C. As in the use of recycle magnesium oxide per se, acidity was observed to decrease and iron hydroxide precipitated almost completely when acidity reached 4–7 gpl. The fresh ore is partially leached. The kinetics of the reaction tend to be slower as the acidity decreases. The neutralization of 600 ml of leachate containing 81 gpl HCl required 849 grams of fresh saprolite ore. The results obtained are indicated in Table 3 as follows:

TABLE 3

| | Neutralization of Leachate with Fresh Saprolite | | | | |
|---|---|---|---|---|---|
| | HCl (g/l) | Ni (g/l) | Fe (g/l) | Co (g/l) | Mg (g/l) |
| Initial Sample | 81.0 | 11.7 | 42.3 | 0.27 | 32.6 |
| Final Sample | 9.5 | 16.8 | 0.44 | 2.86 | 45.7 |

The overall extraction for leaching and neutralization was in the neighborhood of about 60.7%, although the recovery for this stage was about 29.8%. As will be noted, the final sample contained 16.8 gpl Ni.

Figure 3:
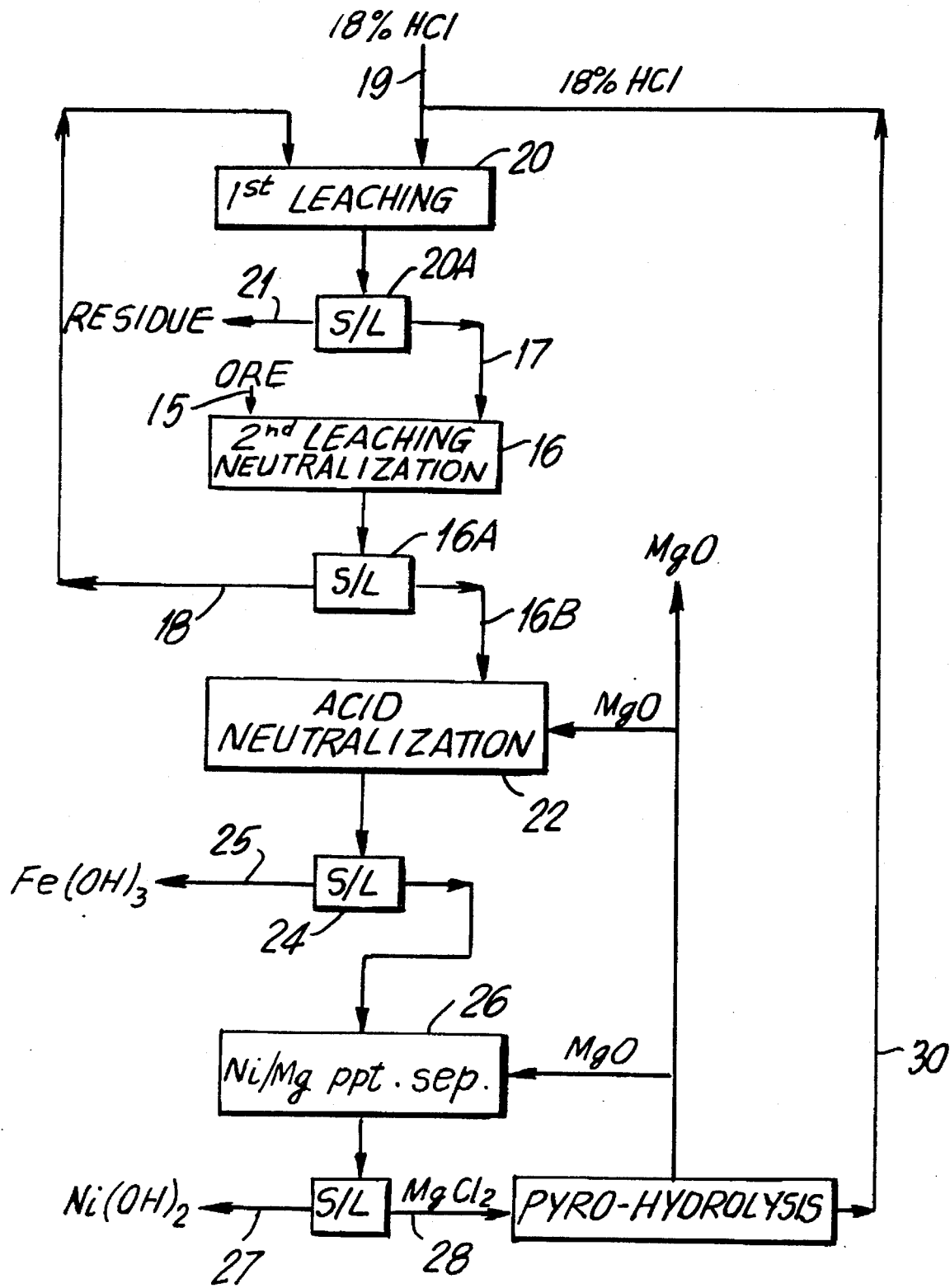
FIG. 3 is illustrative of an embodiment in which a two-stage leaching method is employed using a countercurrent process wherein the ore is leached in a second stage with the solids remaining from second stage leaching recycled to the first stage.

To eliminate one solid/liquid separation process, the step of leaching and neutralization was carried out continuously with no solid/liquid separation between the leaching and neutralization stages. During neutralization, a slurry of fresh A counter current leaching process appears to be attractive where the neutralization step is carried out using fresh saprolite ore. In this process, the residue from the neutralization step is leached under the same conditions as the initial leach and the resulting leachate then neutralized with fresh saprolite ore. The counter current process is illustrated in FIG. 3.

Figure 2:
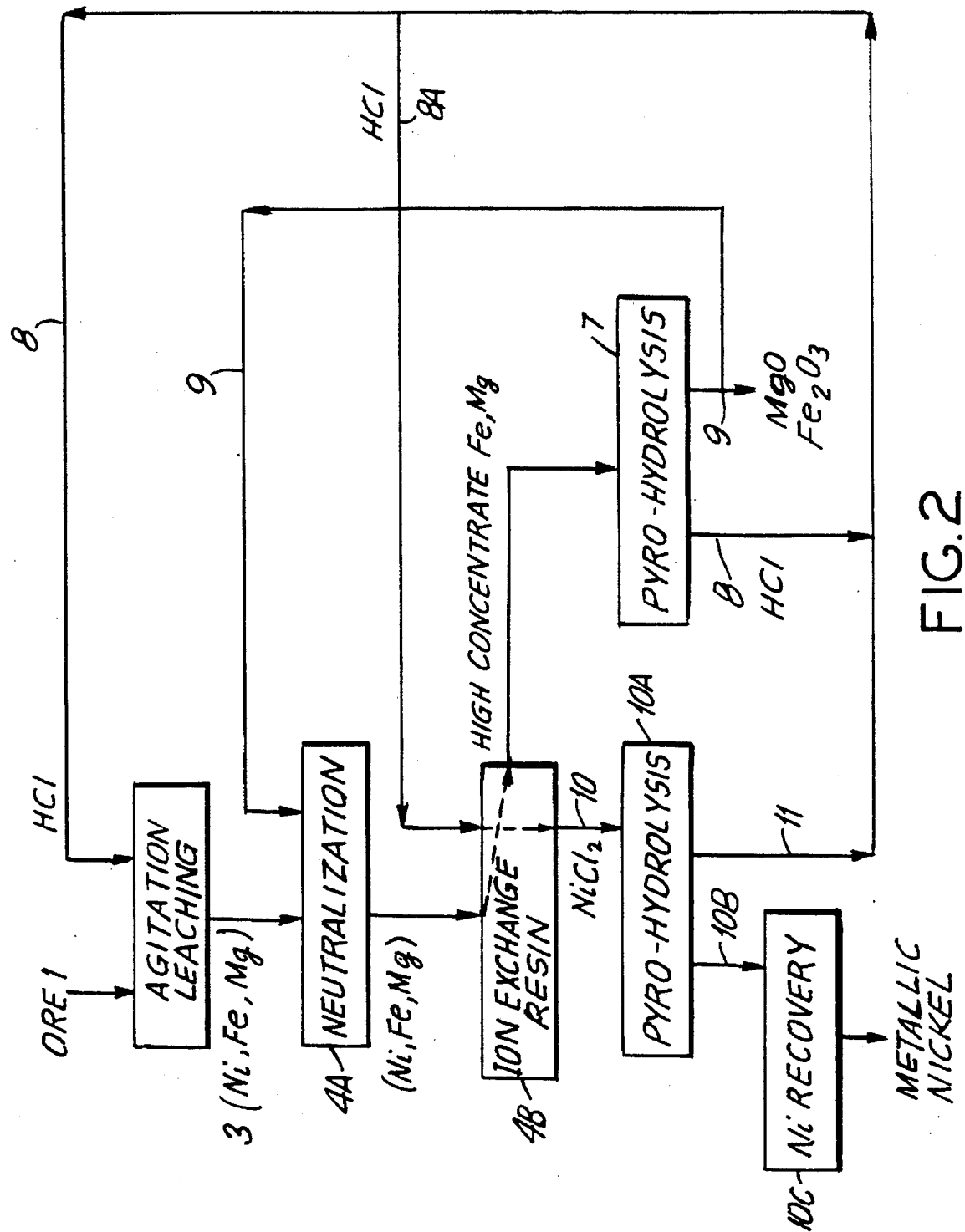
FIG. 2 is a variation of the flow sheet of FIG. 1 wherein agitation leaching is employed to extract the nickel from the ore, the remainder of the process following leaching being similar to the flow sheet of FIG. 1.

As illustrative of the counter current process, the following example is given as it relates to FIG. 2.

EXAMPLE 1

In the counter current leaching process, 300 g of fresh ore was leached at 80° C. with 0.5 L of 6M hydrochloric acid and filtered to produce the leachate required for the neutralization step. Fresh ore was added to the leachate at 80° C. and the acidity decreased to about 10 g/L. The slurry was then filtered and the leachate used in ion exchange. The residue was dried and added to 6M hydrochloric acid at 80° C. The slurry was filtered and the residue sent to tailings. The leachate produced at this stage would then be heated and fresh ore added to it. After filtration, the liquid would go through ion exchange and the cycle repeated in this manner.

COLUMN OR HEAP LEACHING

Five columns of about 60 inches high and 4 inches in diameter were employed in the process. The Saprolite Ore 3 (note Table 1) of particle size less than ¾ inch was agglomerated with acid before it was charged into the columns. The irrigation flow rate was 1.35 ml/min which corresponds to 10 liters per square meter per hour.

As indicated in the agitation leaching test, the "clay-type" saprolitic ore exhibits poor permeability during filtration. Thus, pelletization of the ore is an important expedient for assuring uniform distribution of the reagent throughout the heap or column and for providing pellets of sufficient shape integrity to resist gravimetric flow and yet assure the desired permeability for irrigation or percolation of the reagent solution through the heap or column.

A steady flow rate of 10 liters of the reagent solution per square meter per hour was used during the leaching of the ore, the pelletization parameters employed being as follows:

| | |
|---|---|
| Moisture (dry base:) | 20–60% |
| Acidity of liquid: | 0–12 molar HCl |
| Pellet particle size: | −1 inch +8 mesh |
| Apparent density of column: | 0.9–1.2 kg/liter |
| Porosity of column of ore: | 25–40% |

The practical operation conditions are shown in Table 5.

TABLE 5

Operation Conditions of HCl Column Leaching

| Column No. | Porosity of Column % | Wt. of Ore kg. | Particle Size % −¾ inch | Particle Size % +10 mesh | Particle Size % −10 mesh | Agglomeration Acidity g/l | Agglomeration Acid Volume liter | Leaching Acidity g/l | Leaching on Flow Rates ml/min |
|---|---|---|---|---|---|---|---|---|---|
| 1 | 30.50 | 8.79 | 0 | 0 | 100 | 146 | 3.4 | 15 | 1.4 |
| 2 | 30.50 | 8.98 | 100 | 100 | 0 | 144 | 2.0 | 106 | 1.31 |
| 3 | 30.50 | 9.00 | 100 | 33 | 57 | 144 | 3.5 | 106 | 1.30 |
| 4 | 30.50 | 8.96 | 100 | 33 | 57 | 144 | 3.5 | 55 | 1.30 |
| 5 | 30.50 | 9.00 | 100 | 33 | 57 | 230.6 | 3.4 | 15 | 1.25 |

FIG. 7 depicts the kinetics of nickel extraction under various conditions. The tests indicated that the leaching kinetics were proportional to the agglomeration acidity during the initial leach period and later become proportional to the leach solution acidity. No significant influence was noted as to particle size on the kinetics of column or heap leaching, at least in the particle size range of less than ¾ inch employed in the tests.

The data of Table 6 compare the residual acidity of the leachate and the extraction of Ni, Mg, and Fe in both the agitation leaching and column leaching. The high acidity employed in agitation results in high iron extraction and high residual acidity in the leachate. As mentioned hereinbefore with regard to the neutralization of the leachate with magnesium oxide or the mixture of magnesium oxide and iron oxide or fresh ore, the lower acidity obtained after neutralization caused precipitation of iron within the column, which beneficially results in lower iron extraction, except that the high extraction of nickel also included the extraction of magnesium.

TABLE 6

Extraction of Ni, Fe and Mg and Free Acidity in the HCl Agitation Leachate and Coleman Leach Solutions

| | Free HCl g/l | Ni Ext. % | Fe Ext. % | Mg Ext. % |
|---|---|---|---|---|
| Agitation L2* | 94 | 89 | 54 | 76 |
| Agitation L4* | 122 | 67 | 38 | 79 |
| Column No. 1 on 41st day | 4.26 | 48 | 12 | 43 |
| Column No. 2 on 16th day | 28.4 | 80 | 34 | 81 |
| Column No. 3 on 15th day | 7.22 | 67 | 33 | 58 |
| Column No. 4 on 16th day | 7.8 | 53 | 17 | 47 |
| Column No. 5 on 16th day | 1.28 | 41 | 11 | 28 |

*L2 and L4 are the test code words standing for the agitation leaching tests No. 2 and No. 4

CONSECUTIVE COLUMN LEACHING

In order to make full use of the high residual acidity in the column leachate and to increase the grade of nickel and to adjust the pH of leachate in the range of 1 to 1.5 for the following ion exchange, the leachates from columns 2 and 3 were spiked to the specified feed acidity and fed to columns 4 and 5, respectively. It was found that the extraction rates were not significantly affected by the presence of various ions in the feed solution.

Two columns, N1 and N2 were established to neutralize leachate that is too acidic for effective ion exchange. N1 was agglomerated with 1.4 M hydrochloric acid and N2 was agglomerated with water. When leachate from columns 4 and 5 were fed to N1 and N2, it was found that under these conditions, nickel and magnesium were slowly leached but iron was not extracted to a significant extent. The acidity of the resultant leachate remained in the range of 5–8 g/L residual acid even when the feed solution was changed from 9 g/L to 20 g/L free acid.

SULFURIC ACID COLUMN LEACHING

Three columns of smaller size were employed extending 4 feet high and 4 inches in diameter.

The saprolite No. 1 sample shown in Table 1 was agglomerated to the particle size of −¾ inch +10 mesh and then charged into each of the columns. A fast leaching was conducted wherein the leach flow rate was increased from 10 up to 100 liters per square meter per hour.

The conditions under which the ore was pelletized (or agglomerated) and leached with respect to the extraction of Ni, Fe and Mg are summarized in Table 7 and Table 8 hereinafter.

TABLE 7

Operation Conditions of H2SO4 Column Leaching

| Column No. | Porosity of Column % | Wt. of Ore kg. | Particle Size % | | | Agglomeration Acidity g/l | Agglomeration Acid Volume liter | Leach Acidity g/l | Leach Flow Rates ml/min |
|---|---|---|---|---|---|---|---|---|---|
| | | | −1 inch | +10 mesh | −10 mesh | | | | |
| 1 | 30.50 | 7.8 | 100 | n.a. | n.a. | 0 | 4 | 10 | 1.40 |
| 2 | 30.50 | 7.90 | 100 | n.a. | n.a. | 100 | 4 | 10 | 1.40 |
| 3 | 30.50 | 7.90 | 100 | n.a. | n.a. | 100 | 4 | 30 | 1.40 |

TABLE 8

Extraction of Ni, Fe and Mg in the H2SO4 Leaching

| | Ni Ext. % | Mg Ext. % |
|---|---|---|
| Column No. 1 on 34th day | 40 | 32 |
| Column No. 2 on 34th day | 52 | 40 |
| Column No. 3 on 34th day | 70 | 67 |

A test was conducted using a larger column having a diameter of 6 inches and measuring 15 feet high. The column was loaded with 103 kg of saprolite of particle less than one inch. This was agglomerated with 25.6 liters of 180 gpl sulfuric acid. The acid concentration of the leach solution amounted to 30 gpl and was controlled at a flow rate of 5 liters per square meter per hour.

On the 66th day, the nickel, iron and magnesium extraction were 21.71%, 2.26% and 18.05%, respectively. FIG. 8 is illustrative of the nickel extraction kinetics under various conditions for the three small columns and the large column.

NICKEL RECOVERY BY ION EXCHANGE (IX)

A chelating ion exchange resin referred to as Dow XFS-4195 was used to selectively recover nickel from hydrochloric acid and sulfuric acid column leachates. The active functional group is bis-picolylamine. Since the resin is an amine, the resin is protonated in an acid solution. Reference is made to Table 9 which lists the absorption constants for the different elements. The theoretical capacity for nickel is about 30 grams nickel per liter of well-settled resin.

TABLE 9

The Absorption Constants (K 1/mol) of XFS-4195 (Sulfate Solution pH = 2)

| | Cu | Ni | Fe + 3 | Cd | Zn | Co | Fe + 2 | Ca | Mg | Al |
|---|---|---|---|---|---|---|---|---|---|---|
| K | 700 | 190 | 80 | 70 | 60 | 30 | 3 | <2 | <1 | <1 |

RECOVERY OF NICKEL FROM HCl COLUMN LEACH SOLUTION

One IX column having a volume of 100 ml was used to treat four kinds of leach solutions collected from HCl leaching column No. 2 to No. 5, respectively. The composition is given in Table 10 below.

TABLE 10

The Composition of Feed Solution and Stripping Solution

| Leach Solution | pH | HCl g/l | Al g/l | Fe g/l | Fe + 2 g/l | Mg g/l | Ni g/l | Co mg/l | Cr mg/l | Mn mg/l | Si mg/l |
|---|---|---|---|---|---|---|---|---|---|---|---|
| 2 | 0.59 | 6.6 | 1.4 | 17 | 0.45 | 23 | 5.5 | 59 | 350 | 395 | 77 |
| 3 | 0.64 | 9.0 | 1.8 | 20 | 0.45 | 21 | 5.6 | 74 | 340 | 440 | 69 |
| 4 | 1.2 | 8.0 | 1.1 | 9.6 | 0.92 | 13 | 4.0 | 43 | 235 | 260 | 90 |
| 5 | 1.5 | 4.9 | 1.0 | 5.9 | 1.0 | 7.7 | 3.1 | 43 | 178 | 230 | 79 |

The operating conditions were as follows:

| Bed Volume (BV) | 0.1 liter |
|---|---|
| Flow rate | 0.05 BV/min. |
| Loading | 6 BV |
| Wash No. 1 | 1 BV |
| Stripping solution | 1 BV |
| Wash No. 2 | 1 BV |

The stripping solution comprised 3 M HCl or approximately 109 gpl of HCl.

It was observed that the IX separation of magnesium and nickel was complete and that the IX separation of iron and nickel was influenced by the pH of the feed solution. A higher feed pH was favorable for separating nickel and iron. Table 11 compares the composition of the feed and stripping solutions for different pH's of the feed solution.

TABLE 11

The Composition of the Feed and Stripping Solutions of IX

| IX Column | pH | Feed Solution Fe g/l | Mg g/l | Ni g/l | Stripping Solution Fe g/l | Mg g/l | Ni g/l | Ni/Fe |
|---|---|---|---|---|---|---|---|---|
| 2 | 0.59 | 16.8 | 23.4 | 5.46 | 3.73 | 0.02 | 7.56 | 2.41 |
| 3 | 0.64 | 19.7 | 21.1 | 5.58 | 7.62 | 0.01 | 7.85 | 3.00 |
| 4 | 1.22 | 9.61 | 13.0 | 3.98 | 2.62 | 0.00 | 8.52 | 3.25 |
| 5 | 1.47 | 5.93 | 7.69 | 3.13 | 1.83 | 0.00 | 8.93 | 6.76 |

NICKEL RECOVERY FROM $H_2SO_4$ COLUMN LEACH SOLUTION

Two IX columns with a volume of 0.2 and 3 liters, respectively, were used to determine the nickel recovery from sulfuric acid leach solution at room temperature.

The results obtained are shown in Tables 12 and 13.

TABLE 12

Composition of the Feed Solution

| | pH | H2SO4 | Fe g/l | Fe + 2 g/l | Mg g/l | Ni g/l | SO4 g/l | Al mg/l | Co mg/l |
|---|---|---|---|---|---|---|---|---|---|
| Mix | 1.8 | 7.01 | 2.3 | .05 | 9.3 | 2.8 | 5.9 | 830 | 27 |
| Test 1 | 2.1 | n.a. | 2.2 | n.a | 7.4 | 1.3 | n.a. | n.a | n.a. |
| Test 2 | 1.5 | n.a | 3.6 | n.a | 7.9 | 1.3 | n.a. | n.a | n.a. |

TABLE 13

Basic IX Operational Conditions

| Test | BV Liter | Flow Rate BV/min | Loading BV | Wash 1 BV | Stripping H2SO4 g/l | Stripping BV | Wash 2 BV |
|---|---|---|---|---|---|---|---|
| 1 | 0.2 | 0.1 | 21 | 2 | 100 | 4 | 2 |
| 2 | 3.0 | 0.05 | 17 | 1 | 150 | 1 | 2 |

Compositions of the feed and stripping solution obtained in each of the procedures employed are set forth in Table 14 which shows that the slower flow rate is favorable to the separation of nickel from iron.

TABLE 14

The Effect of Stripping Solution Flow Rates on the Ni/Fe Ratio

| Test | Feed Solution Fe g/l | Mg g/l | Ni g/l | Stripping Solution Fe/gl | Mg g/l | Ni g/l | Ni Fe |
|---|---|---|---|---|---|---|---|
| 1 | 2.16 | 7.4 | 1.28 | 1.89 | 0.04 | 5.00 | 2.68 |
| 2 | 3.62 | 7.9 | 1.32 | 0.57 | 0.04 | 8.55 | 15.00 |

As high concentrations of chlorides are favorable for pyro-hydrolysis, the IX raffinate can be recycled to the columns as leach solution after adjustment of the acidity and the IX stripping solution can also be recycled as stripping solution to increase the nickel concentration before nickel pyro-hydrolysis.

As will be clearly apparent, various flow sheets may be employed in carrying out applicants' novel inventive concept.

Figure 1:
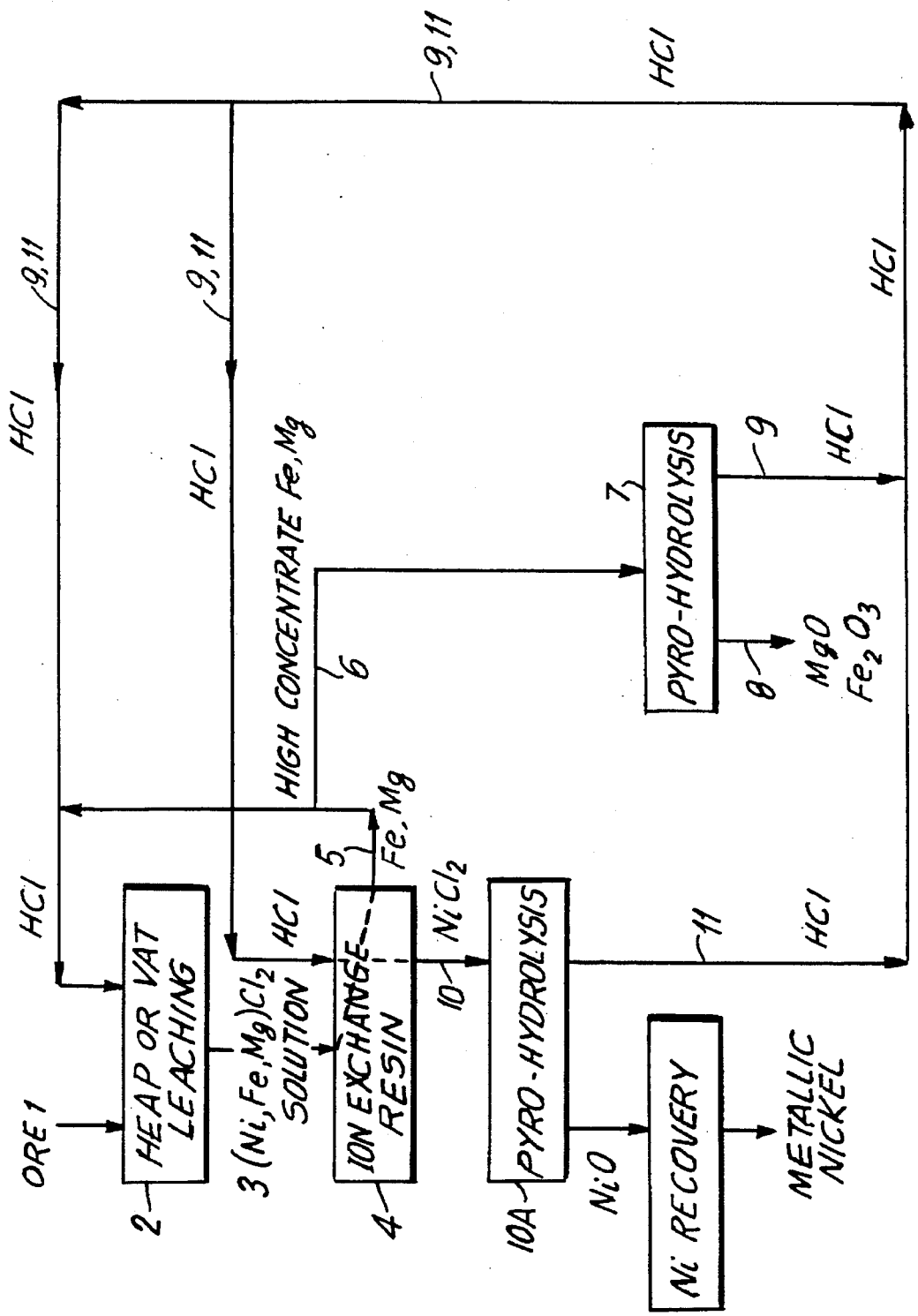
FIG. 1 is a flow sheet for heap or vat leaching high magnesium laterite ores (e.g. saprolite) using hydrochloric acid as the leaching solution.

In this connection, reference is made to the flow sheet of FIG. 1 which is directed to heap or vat leaching wherein ore 1 is formed into a heap shown schematically at 2 into which HCl of concentration of about 3 molar is fed to the heap from top to bottom and the solution allowed to percolate downward through the interstices of the ore, the ore having a particle size of less than about ¾ inch.

The leachate 3 containing the chlorides of Ni, Fe and Mg is neutralized, if necessary, to a pH of about 1 to 2. The leachate is then passed through an ion exchange bed comprised of the resin Dow XFD 4195.

The nickel is selectively absorbed by resin (4) from which a raffinate is obtained containing Mg and Fe, part of which (5) is recycled to heap leaching by means of which the concentration of Mg and Fe in the raffinate is increased.

Part of the raffinate (6) containing high Mg and Fe is subjected to pyro-hydrolysis (7) to produce MgO and $Fe_2O_3$ (8) and HCl (9) which is recycled to resin bed (4) for extracting nickel as nickel chloride (10) and to heap leaching (2) via line 9. The obtained stripping solution is recycled after adjusting the acidity with HCl so that the nickel grade is increased.

The nickel chloride (10) extracted from the resin may be subjected to pyro-hydrolysis (11) to form nickel oxide or, depending upon the concentration of the nickel in the solution, the nickel chloride solution may be sent to electrolysis to produce electrolytic nickel.

In FIG. 9, the flowsheet of FIG. 1 was modified to separate the iron from magnesium by neutralization and to recycle the acidic water generated in the process. Therefore, the accumulation of chloride in the leaching system, which decreases the nickel loading capacity of the resin, is under control. The ore is leached in the same manner using the combined streams of hydrochloric acid produced through pyrohydrolysis (60 and 65) and acidic wash water (49 and 51) produced in the ion exchange wash step (51) and the acidic water used to wash the heap (49) when the leaching is completed.

The raffinate solution high in iron and magnesium concentration (53) is neutralized to pH 6–7 and the waste solid $Fe(OH)_3$ is filtered out. The remaining liquid (57) composed of $MgCl_2$ solution is pyrohydrolysed (59) to yield MgO (61), condensed water (62) and HCl (60) which are all recycled in the process. MgO may be a desired product.

Part of the eluant $NiCl_2$ solution is used in the stripping process of the resin after the acidity is increased. The other part of the $NiCl_2$ solution is pyro-hydrolysed to produce NiO.

The flow sheet of FIG. 2 is similar to that of FIG. 1 except for the use of agitation leaching for treating the ore.

Following agitation leaching of ore (1) with HCl at stage (2) at a concentration of about 6 Molar and a temperature of about 80° C., a solution (3) is produced containing Ni, Fe and Mg. After separation from gangue material, this solution is passed on to neutralization stage (4A). The solution is then neutralized to a pH of about 1 to 2 using recycle MgO or the mixture of MgO or fresh ore which is described hereinafter.

The nickel-containing solution is passed on to resin bed (4B) comprised of a resin selective to the absorption of nickel, for example, DOW XFS 4195 of the type referred to as bis(2-picolyl) amine or N-(2-hydroxyethyl-2-picolylamine.

Another nickel-absorbing resin that may be used is one in which the resin is a macroporous polystyrene copolymer with a weakly basic chelating picolylamine derivative attached, i.e., specifically N-(2-hydroxypropyl)-2-picolylamine.

The nickel is extracted from the resin with HCl, generally recycle HCl, as $NiCl_2$ (10). The nickel chloride may be subjected to pyro-hydrolysis (10A) to form NiO (10B) which may then be reduced to metallic nickel, such as by hydrogen reduction 10C to form nickel powder (10D).

On the other hand, depending upon the concentration of nickel chloride, the nickel may be recovered by electrolysis.

Following nickel absorption with resin (4B), the remaining solution containing high Fe and Mg is subjected to pyrohydrolysis which results in the formation of recycle HCl (8) and $(MgO+Fe_2O_3)$ (9) which is recycled to neutralization stage (4A). The HCl is recycled to either or both of resin bed (4B) and/or agitation leaching 2, thus maintaining HCl within the system for recycling, except for the addition of make-up HCl, if necessary.

Another embodiment of a flowsheet for carrying out the aims of the invention is shown in FIG. 3.

In this case two-stage leaching is employed wherein solids (18) remaining from the leaching of the ore in the second leaching stage are recycled to the first stage.

The ore (15) (high magnesium saprolite) is fed to the second stage leaching (16) where it is leached using the liquid from the first leaching stage (20) to decrease the residual acidity. The first stage leaching is carried out on solids (18) recycled from the second leaching stage (16). Added to solids (18) is an 18% solution of HCl (19) the reaction product of which is fed to solid/liquid separation (20A) where residue (21) is discarded leaving a liquid (17) which is passed to the second leaching stage (16) to form solids/liquid (16A), with the solids thereof recycled to the first leaching stage for further leaching.

The solution (16B) is passed to neutralizing step (22) into which recycle MgO (23) is added to form solids/liquid (25) from which $Fe_2O_3$ solids are removed. The liquid containing nickel chloride is thereafter treated with recycle MgO at stage (26) to precipitate $Ni(OH)_2$ (27) and form $MgCl_2$ (28), the $MgCl_2$ solution being thereafter subjected to pyrohydrolysis (29) to form MgO (23) for recycle into the system as a neutralization agent and HCl (30) for recycle to the first leaching stage (20).

FIG. 4 illustrates column or heap leaching of a high magnesium lateritic ore (e.g., saprolite) using $H_2SO_4$ as the leachant.

Agglomerated ore (31) with a particle size of less than one inch is added to column (32) or formed into a self-sustaining heap through which sulfuric acid (33) of concentration of 0.1 to 2M is passed, the acid percolating through the interstices of the pelletized ore from top to bottom.

The leachate emanating from the bottom of the column or heap is then subjected to neutralization (34) using fresh ore (31) as the neutralizing agent, as shown in consecutive column or in the agitation tank.

The neutralized leachate free of solids is then passed through a bed of an ion exchange resin (36) selective to the absorption of nickel, such as Dow XFS-4195. Following absorption of the nickel, $H_2SO_4$ (35) of concentration of about 1 to 2M is passed through the bed of resin to extract the nickel as nickel sulfate (37) with the sulfuric acid released including magnesium and iron during nickel absorption recycled partially to column leaching stage 32 and to lime (41) neutralization stage 42.

Following lime neutralization, $Fe_2O_3$ (44) is precipitated and a solution of $MgSO_4$ (45) produced. The $MgSO_4$ solution may be further processed to produce MgO and sulfuric acid for recycle into the system.

In preparing the ore for leaching, the ore as mined is crushed using a jaw crusher with the jaws set at a gap of about 1 inch to ¾ inch. The ore is passed once through the jaw crusher.

A typical particle size of the crushed ore is shown in Table 15 as follows:

TABLE 15

| Particle size distribution (% wt) of saprolite ore measured with dry screen | | | | | | | |
|---|---|---|---|---|---|---|---|
| +10 mesh | -10 +35 mesh | -35 +48 mesh | -48 +65 mesh | -65 +100 mesh | -100 +150 mesh | -150 +200 mesh | -200 mesh |
| 25.16 | 29.24 | 2.99 | 6.15 | 5.41 | 9.73 | 8.92 | 12.34 |

In producing the pelletized ore, a rotary pelletizer well known in the art may be employed. In the tests conducted, the pellets were agglomerated manually by causing a mixture of the ore and liquid to move in a circular path and form ball-like shapes. In the case where coarse particles are present, the coarse particles are generally coated with fine particles to form agglomerated pellets together with pellets formed from fine particles.

A typical size distribution of agglomerated pellets for use in heap leaching is shown in Table 16 below:

TABLE 16

| Particle size Distribution (wt %) of Agglomerated Pallets | | | | | | |
|---|---|---|---|---|---|---|
| +⅜ inch | -⅜ inch | -¼ inch + mesh | -4 mesh +6 mesh | -6 mesh +8 mesh | -8 mesh +10 mesh | -10 mesh |
| 49.47 | 26.11 | 12.14 | 7.38 | 2.88 | 0.74 | 1.26 |

Referring to FIG. 10, various types of leaching procedures are illustrated.

Section (A) is illustrative of in-situ leaching of an ore body, referred to as submarginal ore, with an operational capacity of $4 \times 10^6$ tons of ore for the time sequence shown.

In Section (B) "dump leaching" is shown wherein the pile of ore is obtained by bulldozing. The operational capacity is about $5 \times 10^6$ tons of ore for the period shown.

Heap leaching is shown in Section (C) having an operational capacity of $3 \times 10^5$ tons of ore for the period indicated.

Vat leaching is illustrated in Section (D). This type of leaching is similar to heap leaching with an operational capacity of $5 \times 10^3$ tons of ore for the period shown.

Section (E) illustrates mine water leaching due to waters collected after rain in open pit mines.

All of the foregoing methods are referred to a static procedures.

Section (F) of the drawing shows a more dynamic approach to bioleaching, wherein the ore is finely ground and treated by bacteria together with for example, an iron sulfate solution, in a stirred reactor.

In essence, the embodiments illustrated in FIGS. 1–4 have a central theme, namely, the recovery of nickel from high magnesium lateritic ore (e.g., saprolite) without the necessity of smelting the oxide ore to produce ferro-nickel or nickel matte as has long been the practice.

In summary, the novel or key aspects of the present invention reside in the following:

(1) Extraction of nickel from high magnesium saprolitic ore under atmospheric pressure and temperature, (2) Agglomersation of the clay-type saprolitic ore into pellets in order to obtain a uniform distribution of the leach solution through the ore heap or column, including sufficient shape integrity of the pellet to inhibit the gravimetric flow thereof;

(3) The extraction of nickel under atmospheric pressure and temperature of about 60° C. to 80° C. with agitation leaching, or heap or vat leaching;

(4) The separation of nickel from Fe and Mg by means of ion exchange treatment of the pregnant solution while in contact with a resin specific to the extraction of nickel in preference to Fe and Mg at a pH of about 1 to 3;

(5) Adjustment of the pH of the leach solution during consecutive heap leaching using fresh ore or recycled oxides of iron and magnesium produced from pyro-hydrolysis stages; and (6) The use of recycling such as:

(a) The recycling of regenerated acid into the leaching system;

(b) The recycling of the raffinate solution into the leaching system as shown in FIG. 1;

(c) The recycling of the wash solution into the leaching system as shown in FIG. 9; and (d) The recycling of MgO and FeOH$_3$ formed during leaching into the leaching system for adjusting the pH.

By employing the hydrometallurgical process disclosed herein, substantially pure nickel is recovered from the high magnesium ore.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for leaching in a leaching system a high magnesium Ni-Fe-Mg containing lateritic ore in the particulate state containing at least about 5% magnesium, at least about 10% iron and at least about 0.5% nickel which comprises:

contacting said particulate ore of mesh size less than about one inch with a mineral acid solution selected from the group consisting of HCl, H$_2$SO$_4$ and HNO$_3$, the concentration of said acid being at least about 0.25 molar at a temperature at least ambient for a time sufficient to dissolve substantial amounts of said nickel, including iron and magnesium, and thereby forming a pregnant nickel solution thereof, adjusting the pH of said solution, if necessary, to a range of about 1 to 3, extracting said nickel from said pregnant nickel solution by contacting said solution with an ion exchange resin selective to the absorption of nickel and thereby forming a nickel-loaded resin and a raffinate containing said acid, iron and magnesium, separating said raffinate from said resin, extracting said absorbed nickel from said nickel loaded resin by contacting said resin with said mineral acid and forming a soluble nickel salt thereof as an eluate, and recovering nickel from said eluate.

2. The method of claim 1, wherein the pH of said leachate is adjusted by adding a neutralizing agent to said leachate; and wherein any residue remaining in said pH-adjusted leachate is removed prior to the extraction of nickel therefrom.

3. The method of claim 1, wherein the mineral acid for leaching the ore is HCl;

wherein the absorbed nickel is extracted from the nickel-loaded resin with a solution of HCl to form a nickel chloride solution;

wherein said nickel chloride solution is subjected to pryo-hydrolysis to form NiO; and wherein said NiO is further processed to metallic nickel.

4. The method of claim 2, wherein said particulate high magnesium lateritic ore is prepared for heap leaching by forming a mass of said ore having a top and a bottom and characterized by interstitial voids therethrough, wherein said mass of ore is leached by the gravimetric flow of a stream of said mineral acid from the top of said mass to its bottom;

the flow rate of said acid solution being sufficient such that substantial amounts of nickel are leached from said mass of ore to form a pregnant nickel solution thereof and a residue;

wherein said pregnant solution is separated from said residue for further treatment;

wherein said pregnant solution is contacted with said ion exchange resin selective to the absorption of nickel to provide a raffinate containing iron and magnesium;

wherein said nickel is separated from said resin by said mineral acid to form a soluble nickel salt as an eluate thereof; and wherein substantially pure nickel is recovered from said eluate.

5. The method of claim 4, wherein the mineral acid for heap-leaching the ore is HCl, wherein the absorbed nickel is removed for the nickel loaded resin with a solution of HCl to form a nickel chloride solution;

wherein said nickel chloride solution is subjected to pyro-hydrolysis to form NiO; and wherein said NiO is further processed to metallic nickel.

6. The method of claim 4, wherein the particulate high magnesium lateritic ore of particle size less than about one inch is formed into pellets by agglomerating said particulate ore with hydrochloric acid of concentration ranging up to about 12M and thereby form pellets of average size of less than about one inch characterized by shape integrity sufficient to form a self-sustaining mass in the form of a heap or within a column with interstices distributed throughout said mass to enable irrigation and or percolation of said pregnant solution therethrough and thereby produce a pregnant nickel solution.

7. The method of claim 1, wherein a slurry of said high magnesium lateritic ore is formed with a leaching solution of hydrochloric acid of at least about 0.25 molar;

wherein said slurry is subjected to agitation leaching;

wherein said leaching solution extracts said Ni, Fe and Mg from said ore and leaves a residue;

wherein said residue is separated from the leach solution;

wherein said leach solution is passed through a bed of an ion exchange resin selective to the absorption of nickel and produces a raffinate deficient in nickel and containing Fe and Mg;

wherein said absorbed nickel is extracted from said resin with HCl to provide an eluate of nickel chloride;

wherein said eluate is subjected to pyrohydrolysis to form NiO; and wherein said raffinate deficient in nickel is subjected to pyro-hydrolysis to form MgO/FeOH$_3$ for recycle into said leaching system as a neutralizing agent and to produce HCl for recycle into said leaching system and for recycle to said ion exchange resin as a stripping agent.

8. The method of claim 1, wherein said particulate high magnesium lateritic ore is subjected to vat leaching comprising;

forming a charge of said particulate ore in a vat having an inlet and an outlet end;

passing said mineral acid through said vat at a flow rate sufficient to extract substantial amounts of nickel from said ore as a pregnant solution including iron and magnesium;

contacting said pregnant nickel solution with a resin selective to the absorption of nickel and form a nickel-loaded resin and a raffinate deficient in nickel and containing Fe and Mg;

passing mineral acid through said bed of nickel loaded resin to extract said nickel as a soluble salt of said mineral acid as an eluate thereof; and then recovering said nickel from said eluate.

9. The method of claim 8, wherein said resin is a bis (2-picolyl)amine resin.

10. The method of claim 8, wherein said mineral acid is H$_2$SO$_4$;

wherein said nickel-containing eluate is nickel sulfate solution;

wherein said nickel sulfate solution is subjected to electrowinning to form substantially pure electro-nickel.

11. A method for recovering nickel from particulate high magnesium lateritic ore containing Ni, Fe and Mg by counter-current leaching which comprises:

providing a first leaching stage and a second leaching stage wherein primary leaching and neutralization are carried out in the second leaching stage;

leaching said ore with a mineral acid in said second leaching stage to form a solution containing nickel iron, magnesium and recyclable solids;

subjecting said leached ore to solid/liquid separation and thereby recover said recyclable solids for further leaching in said first leaching stage;

recycling said solids to said first leaching stage to which recycle mineral acid is added;

passing a first leachate from said first leaching stage to said second leaching stage to which fresh ore is added for primary leaching;

leaching said ore in said second stage;

passing said second leached ore to solid/liquid separation to separate solids from leachate formed during leaching;

recycling the solids from said second leaching stage to said first leaching together with recycle mineral acid;

subjecting said leachate to further neutralization with recycle MgO;

said neutralization being sufficient to precipitate a basic iron compound in a solution containing dissolved nickel and magnesium;

subjecting said Ni/Mg containing solution to solid/liquid separation to remove the precipitate and provide a Ni/Mg containing solution;

adjusting the pH of the solution with recycle MgO to selective precipitate Ni(OH)$_2$ and provide a solution containing dissolved magnesium;

pyro-hydrolyzing the magnesium-containing solution to form a precipitate of MgO; and recycling said precipitate of MgO to the leachate resulting from the first and second leaching stage to neutralize the leachate to a desired pH to precipitate said basic iron compound and provide a solution containing said Ni and said Mg from which Mg is separated as a solution for pyro-hydrolysis.

12. The method of claim 11, wherein the mineral acid is HCl.

13. A method of heap leaching magnesium Ni-Fe-Mg containing laterite ore in the particulate state containing at least about 5% Mg, at least about 10% Fe and at least about 0.5% nickel by weight which comprises:

agglomerating said particulate ore of particle size less than about one inch with hydrochloric acid of concentration ranging up to 10M, forming a heap of said agglomerated ore, said heap of the ore being characterized by interstices throughout said heap for passing hydrochloric acid therethrough, allowing hydrochloric acid of concentration of at least about 0.25M to percolate througout said heap of ore at a rate sufficient to effect dissolution of the nickel as nickel chloride together with some iron and magnesium as chlorides and form a pregnant solution in thereof;

passing said pregnant solution through a bed of resin selective to the absorption of nickel in preference to iron and magnesium chlorides which chlorides are removed as a raffinate;

subjecting said raffinate to neutralization at a pH selective to the precipitation of iron as FeOH$_3$ while maintaining magnesium chloride in said solution;

passing a stripping solution of HCl of about 2 to 6 molar through said bed of resin after washing said resin with wash water to extract the nickel therefrom as nickel choride;

subjecting said magnesium chloride solution to pyrohydrolysis to form MgO suitable for recycling to neutralization;

hydrolizing said nickel chloride solution in a separate pyro-hydrolysis step to produce NiO and HCl for recycling to heap leaching and to produce water for recycling as wash water within the leaching system, and recovering nickel from said NiO.

14. A method for leaching in a leaching system comprising a first leaching stage and a second leaching stage, a high magnesium containing Ni-Fe-Mg lateritic ore containing at least about 0.5% Ni, at least about 5% magnesium and at least about 10%iron, which comprises:

feeding a charge of particulate ore of mesh size less than about one inch to said second leaching stage, adding to said charge hydrochloric acid of concentration at least about 0.25 molar at a temperature of at least sufficient to dissolve substantial amounts of nickel from said ore and form a pregnant nickel chloride solution containing iron chloride, magnesium chloride and undissolved solids, recycling said undissolved solids to said first leach stage, subjecting said pregnant nickel chloride solution to neutralization sufficient to precipitate iron hydroxide and provide a solution of nickel chloride and magnesium chloride, separating said iron hydroxide from said pregnant nickel chloride solution, neutralizing said pregnant nickel solution sufficient to form nickel hydroxide and leave a solution of magnesium chloride, subjecting said magnesium chloride solution to pyrohydrolysis to form recycle hydrochloric acid and recycle MgO for neutralization, and recycling said hydrochloric acid to said first leaching stage for leaching said solids recycled from said second leaching stage.

15. The method of claim 14, wherein the MgO formed by the pyro-hydrolysis is recycled to said first leaching stage.

16. The method of claim 14, whereas the hydrochloric acid formed by pyrohydrolysis is recycled to the first leaching stage.

17. The method of claim 14, wherein said nickel hydroxide is converted to nickel metal by thermal reduction.

18. The method of claim 14, wherein said nickel hydroxide is dissolved in sulfuric acid to form an acid-containing nickel sulfate solution, and wherein said nickel sulfate solution is subjected to electrolysis to form substantially pure nickel.

* * * * *

UNITED STATES PATENT AND TRADEMARK OFFICE
CERTIFICATE OF CORRECTION

PATENT NO. : 5,571,308
DATED : November 5, 1996
INVENTOR(S) : Willem P.C. Duyvesteyn et al.

It is certified that error appears in the above-indentified patent and that said Letters Patent is hereby corrected as shown below:

Column 17 (claim 7) line 8, "Mgo/FeOH$_3$" should be --Mgo/Fe(OH)$_3$--;

Column 17 (claim 11) line 46, "nickel iron" should be --nickel, iron--;

Column 18 (claim 11) line 5, "selective" should be --selectively--;

Column 18 (claim 13) line 40, "FeOH$_3$" should be --Fe(OH)$_3$--;

Column 18 (claim 13) line 49, "hydrolizing" should be --hydrolyzing--;

Column 20 (claim 16) line 3, "whereas" should be --wherein.

UNITED STATES PATENT AND TRADEMARK OFFICE
CERTIFICATE OF CORRECTION

PATENT NO. : 5,571,308
DATED : November 5, 1996
INVENTOR(S) : Willem P.C. Duyvesteyn et al.

It is certified that error appears in the above-indentified patent and that said Letters Patent is hereby corrected as shown below:

Column 15, line 26. "FeOH$_3$" should read -- Fe(OH)$_3$ --.

Signed and Sealed this

Fifteenth Day of April, 1997

*Attest:*

BRUCE LEHMAN

*Attesting Officer*     *Commissioner of Patents and Trademarks*